United States Patent Office 2,746,899
Patented May 22, 1956

2,746,899

PYRIDINE BY-PRODUCT INSECT REPELLENT AND PROCESS OF APPLICATION

Carolyn E. Tissol, Minneapolis, Minn., and Lyle D. Goodhue, Bartlesville, Okla., assignors to Phillips Petroleum Company, a corporation of Delaware No Drawing. Application January 2, 1952,
Serial No. 264,641

22 Claims. (Cl. 167—33)

This invention relates to novel insect repellents. In one of its more specific aspects it relates to the use of certain high boiling materials resulting from the preparation of alkyl pyridines as insect repellents. In another of its more specific aspects it relates to a method for preparing a repellent for insects such as flies and mosquitoes.

In the constant warfare which is being waged against insects and the damages caused by insects, the emphasis has been placed upon materials and methods for killing such insects. There are many instances where stomach or contact poisons result in satisfactory control of insects. There are, however, many instances where the use of such materials is undesirable and/or dangerous. Thus, it is often more desirable and more satisfactory to employ a material which repels rather than kills the insects which are to be controlled. Thus, an area, normally attractive to insects, from which insects are to be excluded can be treated with an insect repellent so as to render the area repulsive to these insects.

In at least one embodiment of the invention at least one of the following objects is obtained.

It is an object of this invention to provide a novel insect repellent.

It is another object to provide a method for repelling insects.

It is still another object to provide a method for preparing a novel insect repellent.

It is still another object to provide a composition and method for repelling flies.

Other objects will be apparent to one skilled in the art upon reading the disclosure of this invention.

We have discovered that the higher boiling materials from the condensation of ammonia with aldehydes, cyclic trimers of aldehydes or ketones or mixtures thereof to form pyridine and/or pyridine homologues are effective insect repellents. These materials comprise the higher boiling portion of the condensation reaction effluent, namely that portion of the reaction effluent boiling above 180° C. at one atmosphere.

We have discovered that these high-boiling materials are effective agents for repelling insects such as flies, mosquitoes, and the like from surfaces frequented by them, when applied to said surfaces in suitable form, such as solution, powder, lotion, emulsion, aerosol, or the like. By way of example, we have found that it is convenient to dissolve the high-boiling fraction resulting from the condensation reaction of paraldehyde and aqueous ammonia in a suitable solvent, or to employ it in a suitable carrier and to apply the composition so formed to a surface from which insects are to be repelled. Solvents or carriers which we have found applicable to the present invention include those which are substantially inert with respect to our repellent materials. Solvents which are useful for this purpose include acetone, ethyl acetate, diethylether, pyridine, benzene, and the like. The present materials can also be suitably emulsified in water or in petroleum solvents such as the higher boiling isoparaffinic hydrocarbons. Solid inert carrier materials such as talc, kieselguhr, and the like are employed when preparing powders.

There is no upper limit to the concentration that can be employed, except that dictated by economy and solubility of the compound in the solvent used. In some instances, our repellent materials can be advantageously applied directly without a carrier of any kind. However, our preferred range of concentration of repellent material in the solvent or carrier is from 0.5 to 50 weight per cent.

The repellent materials of our invention can be applied for their intended purpose in several ways. The most advantageous and presently preferred way is to spray a liquid composition on a surface from which insects are to be repelled. Generally, about 1 to 10 grams of the active ingredient per hundred square feet of surface is advantageously applied. Larger or smaller amounts can be applied as desired.

Thus, according to the practice of this invention, the locus from which insects, such as flies and mosquitoes are to be repelled is treated with 1 to 10 grams per hundred square feet of surface with the material that results from the condensation reaction of ammonia with ketones, aldehydes or cyclic trimers of aldehydes and which boils above 180° C.

The materials of the present invention are liquids boiling above 180° C. They are generally red-brown in color and have the approximate viscosity of light weight mineral lubricating oils. They are formed in appreciable amounts during condensation reactions of ammonia with ketones, aldehydes, or derivatives of aldehydes wherein substituted pyridines are known to be formed. Aldehydes which can be used in the condensation reaction include acetaldehyde, anisaldehyde, benzaldehyde, para chlorobenzaldehyde and crotonaldehyde. Ketones which can be used include acetone, acetophenone, benzalacetone, and ethylidene acetone. Derivatives of aldehydes include cyclic trimers of aldehydes, such as paraldehyde. Mixtures of aldehydes, ketones and derivatives of aldehydes can also be used. One method whereby the present materials are obtained from the interaction of paraldehyde with aqueous ammonia in the presence of fluorine containing catalysts is described in copending application, Serial Number 135,291, filed December 27, 1949, by J. E. Mahan, now U. S. 2,615,022.

Example I

In a typical condensation reaction to prepare our repellent materials a stainless steel reactor was charged with 11.22 mol per cent paraldehyde, 87.74 mol per cent anhydrous ammonia, and sufficient water to produce a 45 per cent aqueous ammonia solution, and 1.04 mol per cent ammonium bifluoride catalyst. Air was removed by purging with nitrogen prior to the introduction of ammonia. The reactor was then firmly sealed, heated to 255–260° C. and maintained at that temperature for a reaction period of 3 hours. Agitation was maintained by means of an electrically driven platform rocker.

At the end of the reaction period the reaction mixture was cooled to room temperature, approximately 20° C., and acidified to a pH of 2 with 6 N hydrochloric acid. The reaction product was then steam distilled, and the distillation continued until the distillate was no longer acidic. The residue was made basic (pH 11) with 30 per cent sodium hydroxide solution so as to liberate organic bases and again steam distilled. The distillate was treated with 30 per cent sodium hydroxide solution and extracted with chloroform. The extract was stripped of the chloroform in a fractionating column and the remaining liquid was fractionated. The product which boiled above 180° C. amounted to 8.4 mol per cent of the reactants charged, based upon an estimated average molecular weight of 140 for the product.

*Example II*

A composite sample, formed by the combination of the high-boiling materials from several paraldehyde-ammonia condensation reactions conducted according to the method described in Example I, was tested for insect repellency as follows:

In accordance with the sandwich bait method described by L. B. Kilgore in Soap, June 1949, several 1 x 4 inch strips of cardboard were coated with a smooth thin film of unsulfured molasses leaving an uncoated margin of about ¼ inch on all four sides. The prepared cardboard strips were oven-dried at 45° C.

Highly porous paper strips, cut from cushion sheets used in mimeograph stencils, were impregnated with varied amounts of the candidate repellent. Impregnation of the porous strips were effected by immersing them in an acetone solution of the repellent and then allowing the strips to dry over a period of from 4 to 6 hours. The impregnated strips were the same size as the baited cardboards. An impregnated strip was superimposed on each baited cardboard and fastened in place by stapling. The loose fiber construction of the impregnated paper permits the flies to remove the molasses through it.

The prepared strips, i. e. the sandwich baits, were then exposed to houseflies, *Musca domestica*, over 5 days old, which had been starved for 6 hours. Counts of the number of flies feeding on the strips were taken at intervals over a 2½ hour period. A non-repellent material in the sandwich bait becomes black with flies soon after being exposed and the bait will often be entirely consumed in 5 minutes.

Results of tests using material of the composite sample described above are recorded in the following tabulation.

| Compound | Weight Percent | Solvent | Number of Flies Feeding | | | | | | | |
|---|---|---|---|---|---|---|---|---|---|---|
| | | | 5 Min. | 15 Min. | 20 Min. | 45 Min. | 60 Min. | 90 Min. | 120 Min. | 150 Min. |
| High-boiling material from preparation of 2-methyl-5-ethyl pyridine. | 5 | Acetone | 0 | 0 | 1 | 1 | 0 | 1 | 1 | 2 |
| | 2.5 | ...do...... | 1 | 5 | 3 | 5 | 2 | 2 | 4 | 2 |
| | 1.25 | ...do...... | 8 | 4 | 5 | 1 | 6 | 2 | 2 | gone [1] |
| | .625 | ...do...... | 10 | 5 | 2 | 3 | 6 | 3 | gone | ------ |

[1] Molasses bait consumed.

*Example III*

A semi-practical test was conducted in a small room wherein flies were confined. It was noted that flies congregated on the windows of this room no matter what the light intensity on either side of the glass. In testing our fly repellents, these windows were cleaned and then sprayed with a one weight per cent acetone solution of the candidate repellent to provide about 0.02 gram of repellent per square foot of glass. After the solvent had evaporated, flies were introduced into the room. A composite sample having a minimum boiling temperature of 182° C., formed by combining the high-boiling materials from several paraldehyde-ammonia condensation reactions conducted according to the method described in Example I, and tested as just outlined, repelled flies from the windows for 24 hours.

The principal reaction product resulting from the described condensation of ammonia with paraldehyde is 2-methyl-5-ethyl pyridine and 2-methyl-5-ethyl pyridine is not a satisfactory insect repellent.

Variations and modifications are possible within the scope of the disclosure of the present invention, the essence of which is that the material which boils above 180° C. resulting from the condensation of ammonia with ketones, aldehydes or cyclic trimers of aldehydes in an insect repellent and has been used to repell insects such as flies.

We claim:

1. An insect repellent having as its essential active ingredient, in combination with a substantially inert adjuvant in a concentration of about 0.5 to 50 weight per cent, that portion which boils above 180° C., at one atmosphere, of at least one caustic treated, steam distilled reaction product resulting from the liquid phase condensation of ammonia with at least one member selected from the group consisting of ketones, aldehydes and cyclic trimers of aldehydes in the presence of a fluorine-containing catalyst.

2. The repellent of claim 1 wherein ammonia is condensed with an aldehyde.

3. The repellent of claim 1 wherein ammonia is condensed with a cyclic trimer of aldehyde.

4. The repellent of claim 1 wherein ammonia is condensed with paraldehyde.

5. The repellent of claim 1 wherein ammonia is condensed with a ketone.

6. The repellent of claim 1 wherein ammonia is condensed with acetone.

7. The repellent of claim 1 wherein ammonia is condensed with a mixture consisting of aldehydes, ketones and derivatives of aldehydes.

8. The repellent of claim 1 wherein ammonia is condensed with a mixture consisting of aldehydes and derivatives thereof.

9. The repellent of claim 1 wherein ammonia is condensed with a mixture consisting of aldehydes and ketones.

10. The repellent of claim 1 wherein ammonia is condensed with a mixture of ketones and derivatives of aldehydes.

11. A method for repelling insects which comprises treating a locus from which insects are to be repelled with a repelling amount of that portion, which boils above 180° C., at one atmosphere, of at least one caustic treated, steam distilled reaction product resulting from the liquid phase condensation of ammonia with at least one member selected from the group consisting of ketones, aldehydes and cyclic trimers of aldehydes in the presence of a fluorine-containing catalyst.

12. The method of claim 11 wherein ammonia is condensed with an aldehyde.

13. The method of claim 11 wherein ammonia is condensed with paraldehyde.

14. The method of claim 11 wherein ammonia is condensed with a ketone.

15. The method of claim 11 wherein ammonia is condensed with acetone.

16. A method for repelling flies which comprises treating a locus with a repelling amount of that portion, which boils above 180° C., at one atmosphere, of at least one caustic treated, steam distilled reaction product resulting from the liquid phase condensation of ammonia with at least one member selected from the group consisting of ketones, aldehydes and cyclic trimers of aldehydes in the presence of a fluorine-containing catalyst.

17. The method of claim 16 wherein ammonia is condensed with an aldehyde.

18. The method of claim 16 wherein ammonia is condensed with paraldehyde.

19. The method of claim 16 wherein ammonia is condensed with a ketone.

20. The method of claim 16 wherein ammonia is condensed with acetone.

21. A fly repellent having as its essential active ingredient, in combination with a substantially inert adjuvant in a concentration of about 0.5 to 50 weight per cent of said adjuvant, that portion which boils above 180° C., at one atmosphere, of at least one caustic treated, steam distilled reaction product resulting from the liquid phase condensation of ammonia with at least one member selected from the group consisting of ketones, aldehydes and cyclic trimers of aldehydes in the presence of a fluorine-containing catalyst.

22. The repellent of claim 21 wherein ammonia is condensed with paraldehyde.

References Cited in the file of this patent

UNITED STATES PATENTS

| | | |
|---|---|---|
| 2,443,420 | Gresham | June 15, 1948 |
| 2,525,818 | Mahan | Oct. 17, 1950 |
| 2,615,022 | Mahan | Oct. 21, 1952 |

FOREIGN PATENTS

| | | |
|---|---|---|
| 541,655 | Germany | Dec. 24, 1931 |

OTHER REFERENCES

Brown: Insect Control by Chemicals, pp. 74 to 75, 86 to 87 and 129 to 130, 1951.